United States Patent [19]

Yabumoto

[11] Patent Number: 5,802,347
[45] Date of Patent: Sep. 1, 1998

[54] EMULATOR WITH FUNCTION FOR DETECTING ILLEGAL ACCESS TO SPECIAL FUNCTION REGISTER

[75] Inventor: Masahiro Yabumoto, Tokyo, Japan

[73] Assignee: NEC Corporation, Tokyo, Japan

[21] Appl. No.: 527,201

[22] Filed: Sep. 12, 1995

[30] Foreign Application Priority Data

Sep. 12, 1994 [JP] Japan ................................ 6-216919

[51] Int. Cl.$^6$ ................................................ G06F 9/455
[52] U.S. Cl. ............... 395/500; 395/183.04; 364/DIG. 1; 364/232.3; 364/DIG. 2; 364/927.81
[58] Field of Search ........................ 395/500, 700, 395/183.01, 800, 280, 183.04, 726, 727, 728; 364/200 MS File, 232.3, 247, 247.2, 266.3, 900 MS File, 927.81, 940.06

[56] References Cited

U.S. PATENT DOCUMENTS

| 4,939,637 | 7/1990 | Pawloski | 364/200 |
|---|---|---|---|
| 5,062,034 | 10/1991 | Bakker | 364/200 |
| 5,426,769 | 6/1995 | Pawloski | 395/500 |
| 5,504,903 | 4/1996 | Chen et al. | 395/700 |
| 5,548,713 | 8/1996 | Petry et al. | 395/183.01 |
| 5,560,030 | 9/1996 | Guttag et al. | 395/800 |
| 5,566,303 | 10/1996 | Tashiro et al. | 395/280 |
| 5,574,852 | 11/1996 | Bakker et al. | 395/183.04 |

FOREIGN PATENT DOCUMENTS

| 2593621 | 7/1987 | France . |
|---|---|---|
| 2207344 | 8/1990 | Japan . |

OTHER PUBLICATIONS

"A Validation Strategy for Embedded Core ASICS", by R. Hasslen et al., IEEE, ASIC '90: 3rd Annual Seminar, Aug. 1990, pp. P5–3.1 –P5–3.2.

"Designing a VLSI Microprocessor for Emulation", by R. Rivin et al., IEEE, ASIC '90: 3rd Annual Seminar, Aug. 1990, pp. P5–8.1 –P5–8.4.

"αWIT On–Line Debugger for Application Systems Using a μITRON–Specification Operating System", by A. Miyatomi et al., IEEE, TRON Project, 1991 Symposium, Feb. 1991, pp. 38–42.

"An In–Circuit Signal Analyzer for Mixed Signal Digital Signal Processor", by S. Beling et al., IEEE, ICASSP '91: Acoustics, Speech & Signal Processing, Jul. 1991, pp. 1109–1112.

"Monitoring Techniques for RISC Embedded Systems", by K, Jundi et al., IEEE, National Aerospace and Electronics, 1993 Conference (NAECON), Aug. 1993, pp. 542–550.

"An In–Circuit Emulator for TMS320C25", by P. Ching et al., IEEE Transactions on Education, vol. 37, No. 1, Feb. 1994, pp. 51–56.

*Primary Examiner*—Kevin J. Teska
*Assistant Examiner*—Russell W. Frejd
*Attorney, Agent, or Firm*—Sughrue, Mion, Zinn, Macpeak & Seas, PLLC

[57] ABSTRACT

An interface section controls a communication interface between an in-circuit emulator and a host computer. A CPU core board for emulating a CPU core section of the computer has therein a special function register illegal access detector which stores device file data in a RAM under control of a RAM I/O, before a data analyser employs the data to generate a signal of a decision on an illegalness of an access, which signal is output to the computer. A device dependent board executes a emulation of a peripheral of the computer.

6 Claims, 11 Drawing Sheets

FIG. 7

| ADDRESS | | | |
|---|---|---|---|
| 0000 SPEC.FUNC.REG 1 | READ ONLY "01" | 8 BIT "0" |
| 0001 SPEC.FUNC.REG 2 | READ WRITE "11" | 8 BIT "0" |
| 0002 SPEC.FUNC.REG 3 | READ ONLY "01" | 16 BIT "1" |
| 0003 SPEC.FUNC.REG 4 | READ ONLY "01" | 16 BIT "1" |
| 0004 | NO ADDRESS ASSIGNED "000" | |
| 0005 SPEC.FUNC.REG 5 | WRITE ONLY "10" | 8 BIT "1" |
| 0006 ⋮ 03FF | | |

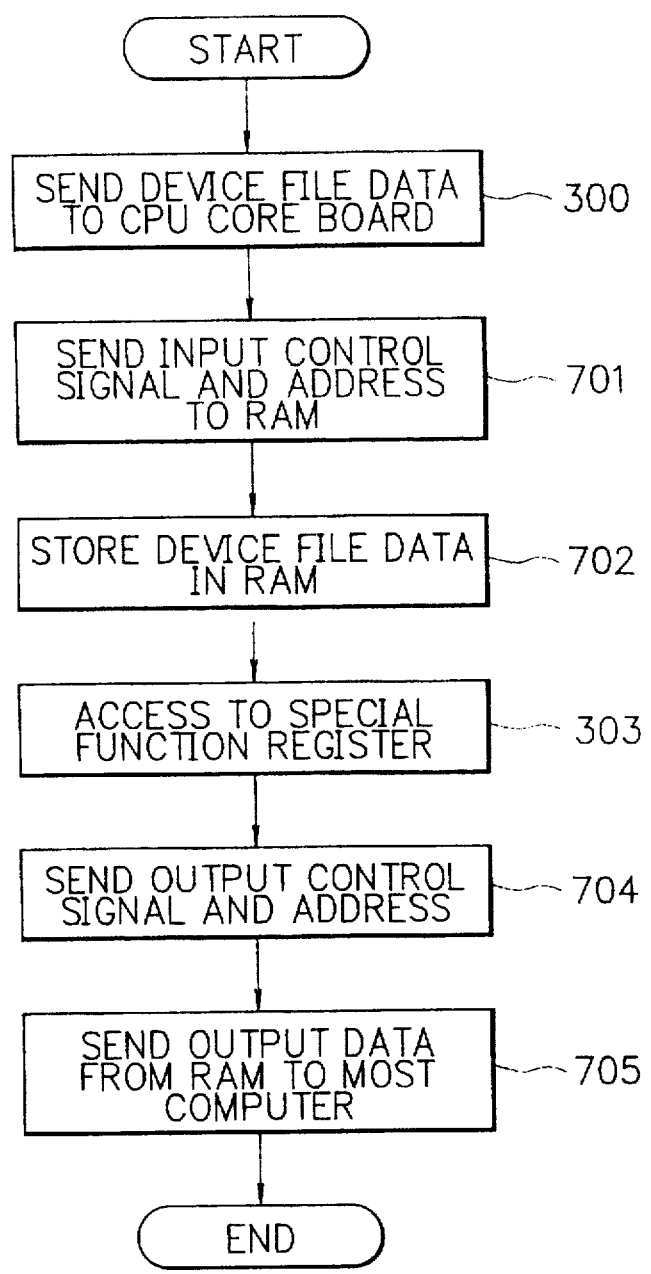

FIG. 11

| | | | | |
|---|---|---|---|---|
| SPEC.FUNC.REG 1 | 0000 | 8 BIT WRITE | "0" | |
| SPEC.FUNC.REG 2 | | 8 BIT WRITE | "1" | |
| SPEC.FUNC.REG 3 | | 8 BIT WRITE | "0" | |
| SPEC.FUNC.REG 4 | | 8 BIT WRITE | "0" | ⎬ 800 |
| | | 8 BIT WRITE | "0" | |
| SPEC.FUNC.REG 5 | | 8 BIT WRITE | "1" | |
| | ⋮ | | | |
| SPEC.FUNC.REG 1 | 0400 | 8 BIT READ | "1" | |
| SPEC.FUNC.REG 2 | | 8 BIT READ | "1" | |
| SPEC.FUNC.REG 3 | | 8 BIT READ | "0" | |
| SPEC.FUNC.REG 4 | | 8 BIT READ | "0" | ⎬ 801 |
| | | 8 BIT READ | "0" | |
| SPEC.FUNC.REG 5 | | 8 BIT READ | "0" | |
| | ⋮ | | | |
| SPEC.FUNC.REG 1 | 0800 | 16 BIT WRITE | "0" | |
| SPEC.FUNC.REG 2 | | 16 BIT WRITE | "0" | |
| SPEC.FUNC.REG 3 | | 16 BIT WRITE | "0" | |
| SPEC.FUNC.REG 4 | | 16 BIT WRITE | "0" | ⎬ 802 |
| | | 16 BIT WRITE | "0" | |
| SPEC.FUNC.REG 5 | | 16 BIT WRITE | "0" | |
| | ⋮ | | | |
| SPEC.FUNC.REG 1 | 0C00 | 16 BIT READ | "0" | |
| SPEC.FUNC.REG 2 | | 16 BIT READ | "0" | |
| SPEC.FUNC.REG 3 | | 16 BIT READ | "1" | |
| SPEC.FUNC.REG 4 | | 16 BIT READ | "1" | ⎬ 803 |
| | | 16 BIT READ | "0" | |
| SPEC.FUNC.REG 5 | | 16 BIT READ | "0" | |
| | ⋮ | | | |

EMULATOR WITH FUNCTION FOR DETECTING ILLEGAL ACCESS TO SPECIAL FUNCTION REGISTER

BACKGROUND OF THE INVENTION

The present invention relates to an emulator, and particularly to an in-circuit emulator with a function for detecting an illegal access to a special function register in a host computer.

DESCRIPTION OF THE RELATED ART

In general, the in-circuit emulator is provided for a particular microcomputer, to check whether or not a firmware of the microcomputer works correctly, by emulating steps of a program of the firmware.

A typical in-circuit emulator for a model in a series of a single-chip microcomputer comprises a CPU (central processing unit) core board for emulating a CPU core section of the microcomputer that is common to the series, and a device dependent board for emulating a peripheral device of the microcomputer. The device dependent board is prepared for each developed description or model.

The in-circuit emulator has as one of various functions thereof a function for detecting an illegal access to a special function register in a host computer. The detection function is responsive to some device-dependent parameters of the computer. Accordingly, conventional measures for that function have been installed in a device dependent board.

To this point, in fields of emulation and debugging, the special function illegal access detection function is one of standard services. A typical circuit for the function includes measures common to a computer series rather than being dependent to a device. The device dependent board however is designed and estimated, model by model, consuming a large amount of man-hours. Except for an original model, repeated designs and estimations of such measures waste much man-hours, which is problematic in view of an increasing importance of cost performance in the field. Such wasted man-hours should be possibly reduced.

Incidentally, the special function register is one of registers employed in a microcomputer, not for a general purpose, but for a predetermined purpose peculiar to a certain device. As oriented to a certain use such as for a peripheral environmental setting of a device, the special function register has three parameters dependent on the device.

One of the three is a parameter on address assignment in a special function register region in which some addresses may be assigned as special function registers, but others may not. Accesses to unassigned addresses should be illegal.

Another is a parameter as to whether or not the special function register allows an access for read and/or write. A write access to a read-only special function register should be illegal, as well as a read access to a write-only special function register.

The rest is a parameter on a length of data that the special function register is adapted to accept or process. An 8-bit access to a spacial function register adapted for a 16-bit length should be illegal, as well as a 16-bit access to a special function register adapted for an 8-bit length.

A conventional in-circuit emulator will be described with reference to FIGS. 1 to 3.

FIG. 1 shows an exemplary arrangement of the conventional emulator.

In FIG. 1, designated at character 900 is the emulator, which is connected to a host computer 101 by a cable 102.

The conventional emulator 900 comprises an interface section 103 for interface to the host computer, a system bus 104, a device dependent board 902 and a CPU core board 904.

The interface section 103 comprises a circuit for controlling to interface communications with the host computer 101. The interface section 103 is connected via the system bus to the CPU core board 904. The core board 904 is connected to the device dependent board 902.

The device dependent board 902 includes a special function register illegal access detector 906, which comprises a data analyzer 133 and a read-only memory (ROM) 908. The data analyzer 133 receives output data from the ROM 908 as an input signal "a" thereto, compares it with a status signal "b" input from the CPU core board 904, thereby checking for an illegal access in the computer 101, and outputs to the CPU core board 904 a signal "c" representative of a result of the check.

The ROM 908 comprises a memory circuit with device file data stored therein. The device file data comprise a set of data collected at an address in a special function register region, as to whether or not the address is assigned as a special function register, whether or not the special function register is accessible for read and/or write, and which length of data is acceptable to be processed.

The device dependent board 902 including the special function register illegal access detector 906 of such an arrangement is developed anew for each developed model of a device, and is replaced from time to time to thereby cope with a development of the device.

FIG. 2 shows an exemplary circuit diagram of the data analyzer 133. Like members to FIG. 1 are designated with like characters.

As shown in FIG. 2, the data analyzer 133 comprises five OR gates 214, 215, 219, 222 and 224, six AND gates 217, 218, 220, 221, 225 and 226, and two NOT gates 216 and 223.

The data analyzer 133 receives as the input signal "a" thereto the output data from the ROM 908, which comprise three signals D2, D1 and D0. The status signal "b" input from the CPU core board 904 to the data analyzer 133 comprises three signals, i.e., an EXURWB signal, an ESTBL signal and an ESTBH signal. The output signal "c" of the data analyzer 133 is output from the AND gate 226.

The ROM 908 receives an input signal 910 thereto, which comprises two signals, i.e., an STAD signal and an SA(9:0) signal.

The signals STAD, SA(9:0), EXUWRB, ESTBL, ESTBH, D2, D1 and D0 are defined as follows.

```
STAD    = 0 for an access to a special function
              register, or
        = 1 for others.
SA(9:0) = an address signal of a special function
              register. See FIG. 3 showing a device file
              data memory map including a special
              function register region allocated between
              addresses 0000 and 03FF.
EXURWB  = 0 for a write access, or
        = 1 for a read access.
ESTBL   = 0 for an access to an odd number address,
              or
        = 1 for an access to an even number address
              and an 8-bit access.
ESTBH   = 0 for an access to an even number address,
              or
        = 1 for an access to an odd number address and
```

-continued a 16-bit access.
D2 = 0 for a write access prohibited and
no assignment of special function register,
or
= 1 for a write access enabled.
D1 = 0 for a read access prohibited and
no assignment of special function register,
or
= 1 for a read access enabled.
D0 = 0 for an acceptable datalength of 8 bits
and no assignment of special function
register, or
= 1 for an acceptable datalength of 16 bits.

The data analyzer 133 processes the foregoing signals to make a decision as to (1) whether or not an address is assigned for a special function register, (2) whether or not a read/write access is correct, and (3) whether or not a datalength to be processed is correct, as follows.

(1) Decision as to whether or not an address is assigned for a special function register:

The OR gates 214 and 215 are responsible for the decision. In the case of no assignment of special function register, the OR gate 215 outputs "0". In the case an address is assigned, the OR gate 215 outputs "1".

(2) Decision as to whether or not a read/write access is correct:

For a write access, the AND gate 217 is responsible for the decision. If the write access is correct, the AND gate 217 outputs "1". If the write access is prohibited, the AND gate 217 outputs "0".

For a read access, the AND gate 218 is responsible for the decision. If the read access is correct, the AND gate 218 outputs "1". If the read access is prohibited, the AND gate 218 outputs "0".

The outputs from the AND gates 217 and 218 are supplied to the OR gate 219 of a 2-input type. The OR gate 219 which outputs "1" when either one of the read and write accesses is correct or "0" if each of them is incorrect.

(3) Decision as to whether or not a datalength to be processed is correct:

For a 16-bit access, the AND gates 220 and 221 are responsible for the decision. If the 16-bit access is correct, the AND gate 221 outputs "1". In the case it is incorrect, the AND gate 221 outputs "0".

For an 8-bit access, the AND gates 220 and 222 and the NOT gate 223 are responsible for the decision. If the 8-bit access is correct, the NOT gate 223 outputs "1". In the case it is incorrect, the NOT gate 223 outputs "0".

The outputs from the AND gate 221 and the NOT gate 223 are supplied to the OR gate 224 of a 2-input type, which outputs "1" when the datalength to be processed is correct or "0" if it is incorrect.

The results of decisions (1) to (3) are output from the OR gates 215, 219 and 224, as described. The outputs from the AND gates 215 and 219 are supplied to the OR gate 225 of a 2-input type, which calculates a logical product of them to be output to one input terminal of the AND gate 226 of a 2-input type. The output from the OR gate 224 is supplied to the other input terminal of the AND gate 226. Accordingly, when the results of decisions (1) to (3) are all correct, the AND gate 226 outputs "1" as the signal "c". In other cases, i.e., in case of an illegal access, the AND gate 226 outputs "0" as the signal "c".

Reffering again to FIG. 1, in the emulator 900, the ROM 908 has the device file data written therein by using a ROM writer.

When a user's program has an access to a special function register, the CPU core board 904 inputs the STAD signal "0" to a chip select terminal of the ROM 908, and the SA(9:0) signal to an address terminal A9-0 of the ROM 908.

The STAD signal drives the ROM 908 into an output action in which data are read from an address designated by the SA(9:0) signal and supplied as the signals D2, D1 and D0 to the data analyzer 133.

The data analyzer 133 processes the signals D2, D1 and D0 to make a decision as to whether or not an address is assigned for the special function register, whether or not the read/write access is correct, and whether or not a datalength to be processed is correct, as described, and outputs the signal "c" that represents a result of decision as to an illegal access to the special function register, to the CPU core board 904.

The CPU core board 904 supplies the input result of decision on an illegal access to the special function register via the system bus 104, the interface section 103 and the cable 102 to the host computer 101.

The conventional in-circuit emulator 900 has the special function register illegal access detector 906 provided on the device dependent board 902 of which design and estimation processes thus waste much man-hours, which is problematic. The amount of such wasted man-hours increases, as the device dependent board 902 has an increased number of developed models.

Moreover, the device file data are stored in the ROM 908, which prevents a flexible follow-up to changes of special function registers, as the ROM requires much labor for a deletion of contents.

There are known implementations to cope with various CPUs by use of an identical CPU core board, such as one proposed in the Japanese Patent Application Laid-Open Publication No. 2-207344, which however does not include an essential parameter to special function registers, i.e., a parameter on a datalength to be processed, thus failing to cope with changes of datalength. In addition, the proposed implementation checks an entire memory space of a computer, resulting in a reduced speed and an increased memory capacity.

In this concern, it has been difficult for an identical or common program to have a ROM substituted by a random access memory (RAM). The RAM contains data different by devices and unable to be used for the identical program.

The present invention has been achieved with such points in mind.

SUMMARY OF THE INVENTION

It is therefore an object of the present invention to provide an emulator with a function to detect an illegal access to a special function register, permitting an effective reduction in number of man-hours wasted in design and estimation processes of a device dependent board.

It also is an object of the present invention to provide an emulator with a function to detect an illegal access to a special function register, that permits facilitated adjustment with a change of the special function register.

To achieve the objects, a genus of the present invention provides an emulator comprising a CPU core board means for emulating a core section of a central processing unit of a microcomputer, a device dependent board means for executing an emulation of a peripheral of the central processing unit, and an interface means for interfacing the CPU core board means and the device dependent board means with the microcomputer. The interface means inputs therethrough necessary data for detecting an illegal access of an object device of the emulation to a special function register, from the microcomputer to the CPU core board means. The CPU core board means has therein a special function register illegal access detector means for storing therein the necessary data, before outputting a signal of a decision on an illegalness of the access based on the necessary data via the interface means to the microcomputer.

According to a species of the genus of the invention, the special function register illegal access detector means comprises a readable and writable memory means for storing therein the necessary data input from the microcomputer, an input-output control means for controlling the memory means in accordance with the necessary data, and a data analyzer means for responding to the necessary data read from the memory means to make the decision as to whether or not the access is to a storage region assigned for the special function register, whether or not the access is a read access to the special function register to be readable, whether or not the access is a write access to the special function register to be writable, and whether or not the access is by a correct length of data to be processed, and to output the signal of the decision.

According to another species of the genus of the invention, the special function register illegal access detector means comprises a readable and writable memory means for storing therein the necessary data input from the microcomputer, and an input-output control means for responding to the necessary data input from the microcomputer to make the decision as to whether or not the access is to a storage region assigned for the special function register, whether or not the access is a read access to the special function register to be readable, whether or not the access is a write access to the special function register to be writable, and whether or not the access is by a correct length of data to be processed, to generate an address based thereon and to supply the address to the memory means, and the special function register illegal access detector means reads the signal of the decision from the memory means.

According to the present invention, therefore, necessary data for detecting an illegal access of an object device of emulation to a special function register are input from a host computer via an interface section to a CPU core board, thereby eliminating a conventional special function register illegal access detector from a device dependent board subjected to design and estimation processes for each developed model of a device, thus permitting an effective reduction in number of required man-hours for such processes.

Moreover, according to the present invention, necessary data for detecting an illegal access of an object device of emulation to a special function register are read from a host computer via an interface section, to be stored in a special function register illegal access detector, permitting a facilitated and flexible adjustment to a change in a special function register which typically tends to have a limitation to a length of data to be processed, thus permitting a remarkable effect to be achieved along with such a change as well as in detection of an illegal access.

Further, an arrangement with a readable and writable memory in a special function register illegal access detector allows an increased processing speed. In addition, data to be stored in the memory are limited to those necessary for detecting an illegal access of an object device of emulation to a special function register, permitting the more improved high-speed processing.

Furthermore, a special function register illegal access detector provided in a CPU core board effectively eliminates the need of an interface signal to be output to a device dependent board, thus permitting a total signal line length to be reduced, resulting in an improved noise margin.

In addition, a special function register illegal access detector is composed of a memory and an input/output control that generates an address in accordance with a decision as to which special function register is accessed in what manner, without the need of a data analyzer, permitting a simplified circuit arrangement.

BRIEF DESCRIPTION OF THE DRAWINGS

The objects, features and advantages of the present invention will become more apparent from consideration of the following detailed description, taken in conjunction with the accompanying drawings, in which:

FIG. 7 is an exemplary device file data map for describing operations of the emulator of FIG. 4;

FIG. 10 is a flow chart of operational steps in the emulator of FIG. 9; and

FIG. 11 is an exemplary device file data map for describing operations of the emulator of FIG. 9.

DESCRIPTION OF THE PREFERRED EMBODIMENTS

There will be detailed below preferred embodiments of the present invention, with reference to FIGS. 4 to 11.

Figure 1:
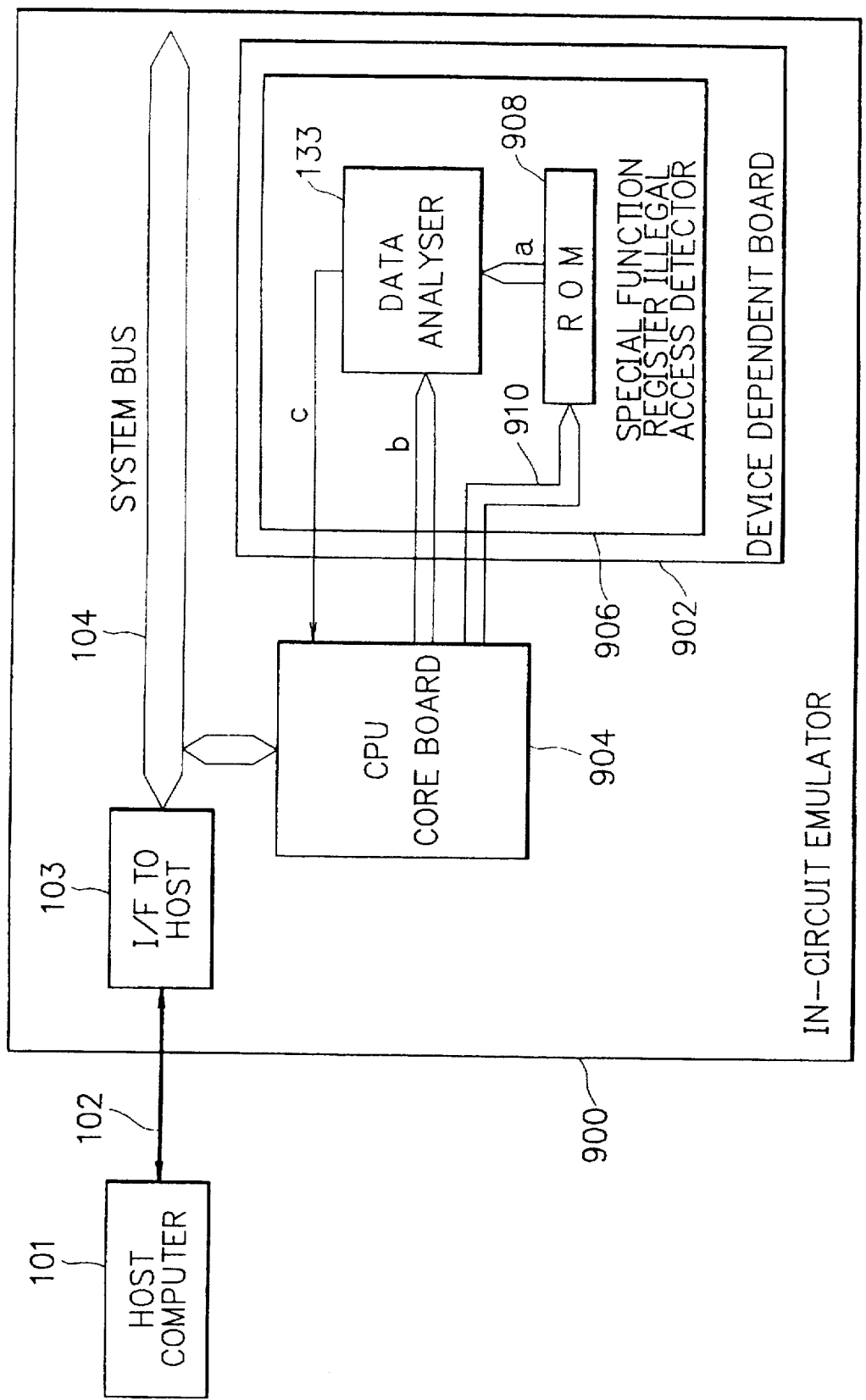
FIG. 1 is a block diagram of a conventional in-circuit emulator.
Figure 4:
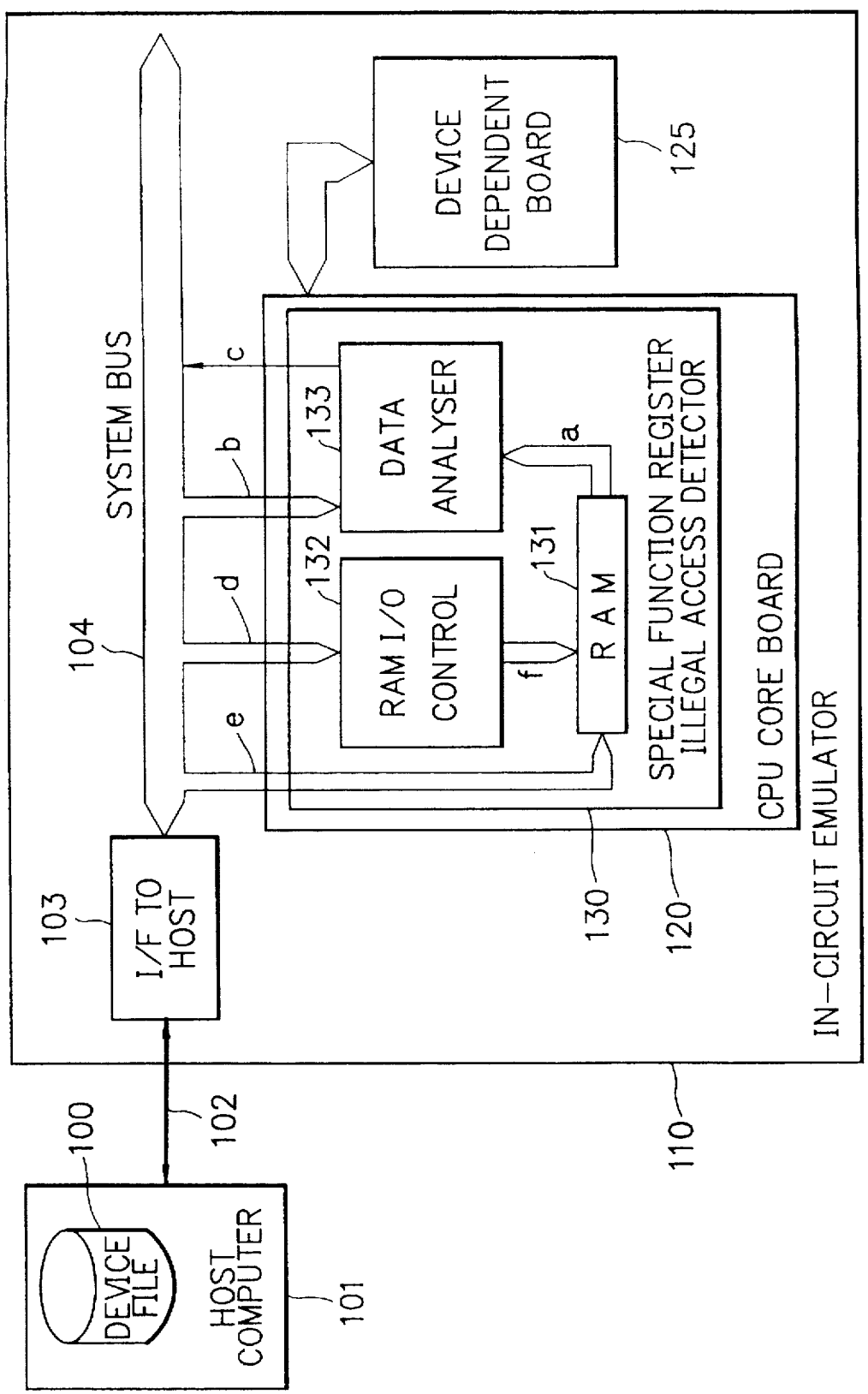
FIG. 4 is block diagram of an emulator according to an embodiment of the invention.

FIG. 4 shows an arrangement of an in-circuit emulator according to a first embodiment of the invention. Like members to FIG. 1 are designated with like characters.

In FIG. 4, designated at character 110 is the in-circuit emulator, which comprises an interface section 103 for interface to host computer, a system bus 104, a CPU core board 120 and a device dependent board 125. The emulator 110 is different from the conventional emulator 900 in arrangement of the CPU core board 120 and the device dependent board 125.

The interface section 103 is a circuit section for controlling a communication interface between the emulator 110 and a host computer 101, and is connected via the system bus 104 to the CPU core board 120. The CPU core board 120 is connected to the device dependent board 125. The emulator 110 is connected via a cable 102 to the host computer 101 which has device file data 100.

The CPU core board 120 is for executing an emulation of a CPU core section of the computer 101 that is common to a computer series to which the computer 101 belongs. The device dependent board 125 is for executing an emulation of a peripheral device of the computer 101. The CPU core board 120 and the device dependent board 125 are different from conventional ones in that a special function register illegal access detector 130 is replaced onto the CPU core board 120. Other functions of the device dependent board are left as they have been.

The special function register illegal access dectetor 130 is different from the conventional one so that it comprises a RAM 131 accessible for read and write, a RAM I(input)/O (output) control 132 and a data analyzer 133. The RAM 131 is a memory for storing a set of device file data read from the host computer 101. The RAM I/O control 132 generates input/output control signals. The data analyzer 107 compares output data "a" from the RAM 131 with a status signal "b" to make a decision as to whether an access is illegal, and outputs a result of the decision as a signal "c".

Figure 5:
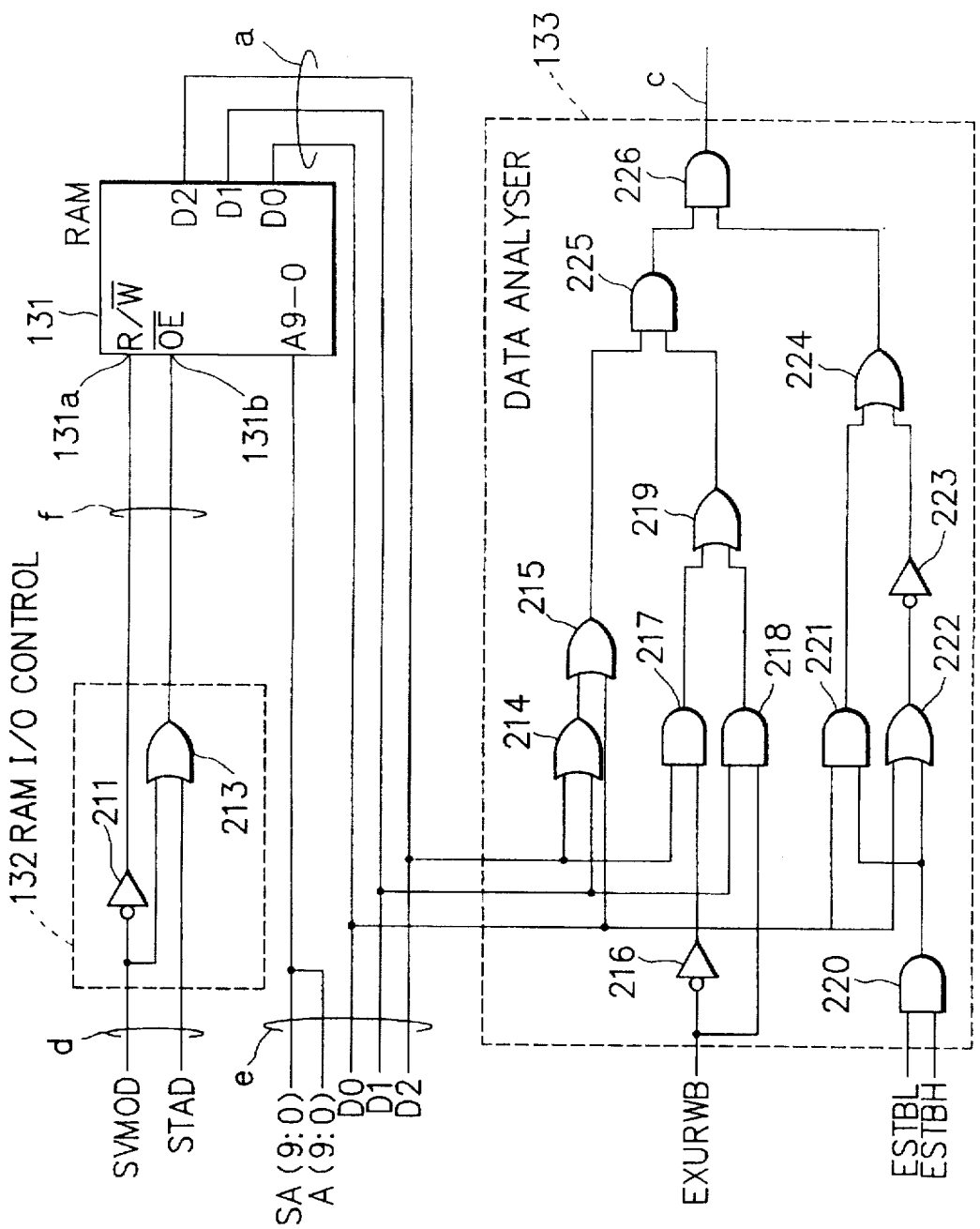
FIG. 5 is a circuit diagram of a special function register illegal access detector of the emulator of FIG. 4.

FIG. 5 is a circuit diagram of the special function register illegal access detector 130. Like members to FIG. 4 are designated with like characters.

Figure 2:
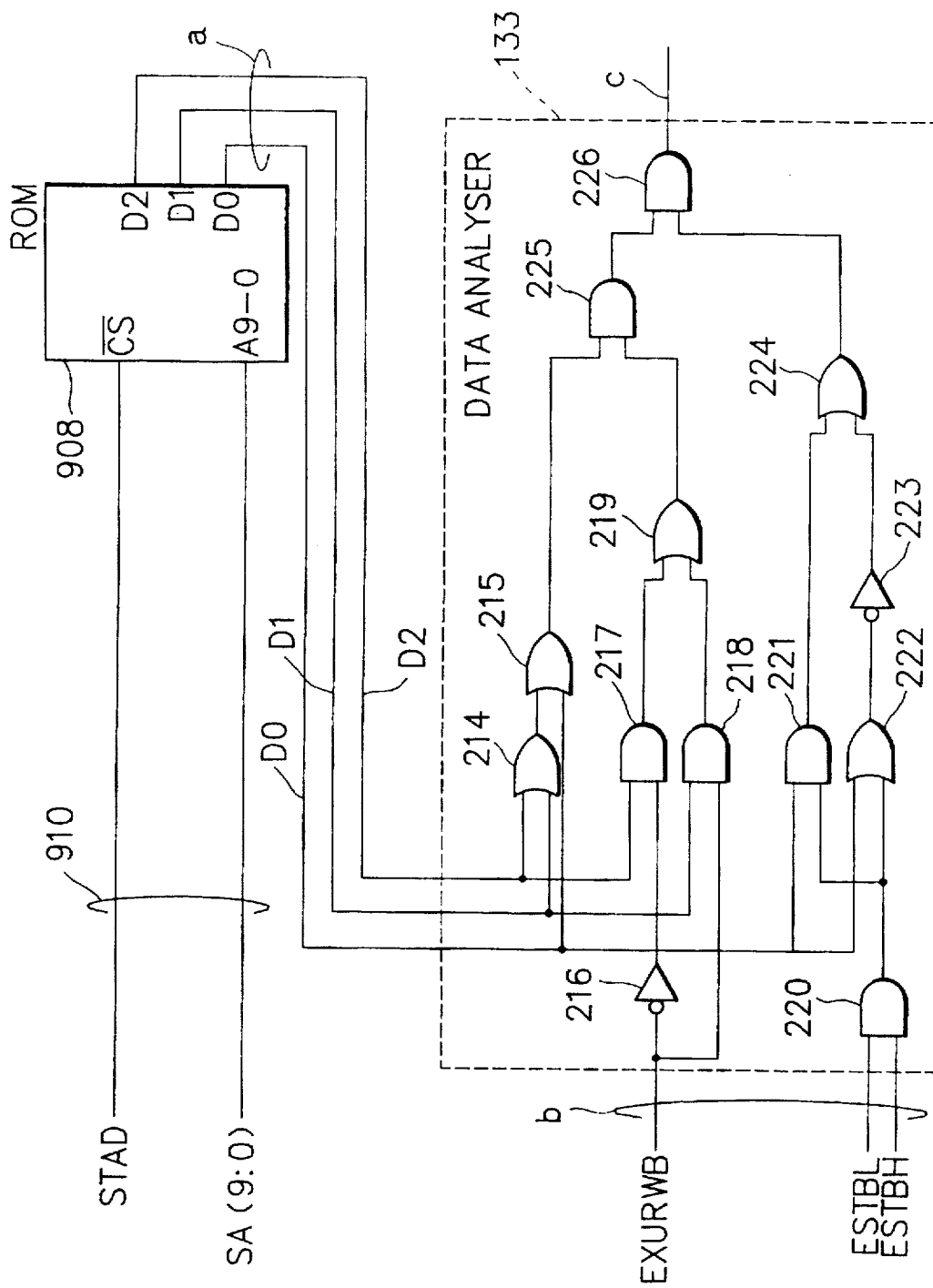
FIG. 2 is a circuit diagram of a special function register illegal access detector of the emulator of FIG. 1.
Figure 3:
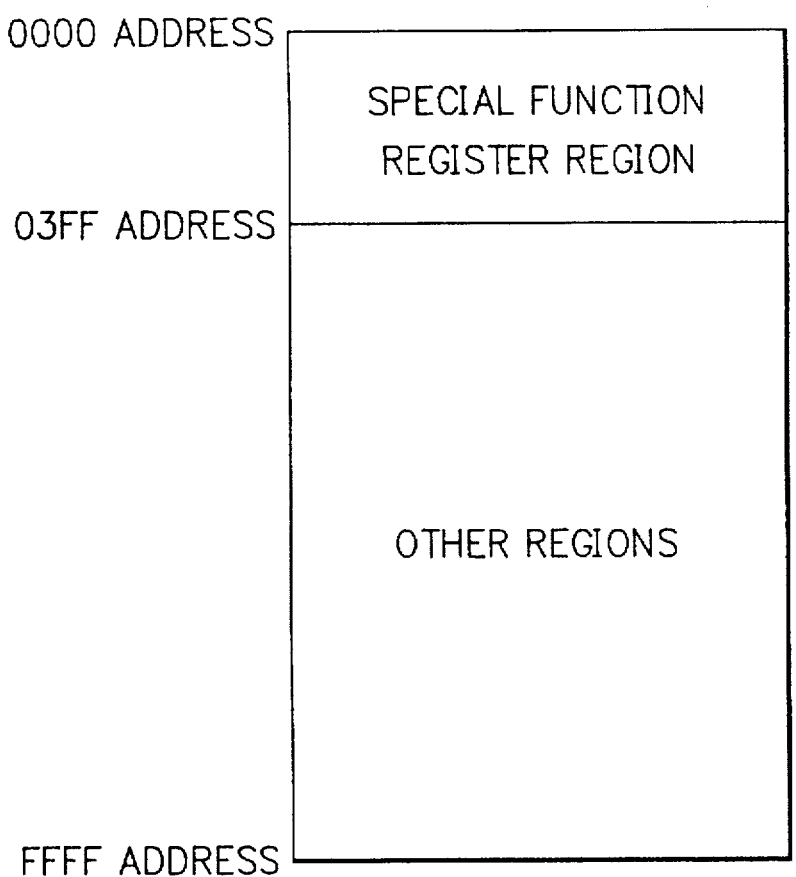
FIG. 3 is an exemplary device file data map for describing operations of the emulator of FIG. 1.

The data analyzer 133 of FIG. 5 is the same as that of FIG. 2. The RAM I/O control 132 comprises a NOT gate 211 and a 2-input OR gate 213. The RAM 131 has a read/write control terminal 131a for inputting an output from the NOT gate 211, and an output enable terminal 131b for inputting an output from the OR gate 213.

The RAM I/O control 132 is supplied with a signal "d" from the system bus 104, which signal "d" comprises an SVMOD signal and an STAD signal. The SVMOD signal is "0" during execution of an user's program, or "1" in other status. The STAD signal is "0" when a special function register is accessed, or "1" in other status.

The RAM 131 is supplied with a signal "e" from the system bus 104, which signal "e" comprises a combination of five signals, i.e., an SA(9:0) signal, an A(9:0) signal, a D2 signal, a D1 signal and a D0 signal. The A(9:0) signal is an address signal employed for storing the device file data 100 in the RAM 131.

The output signals from the NOT gate 211 and the OR gate 213 to the RAM 131 are collectively called as a signal "f".

Figure 6:
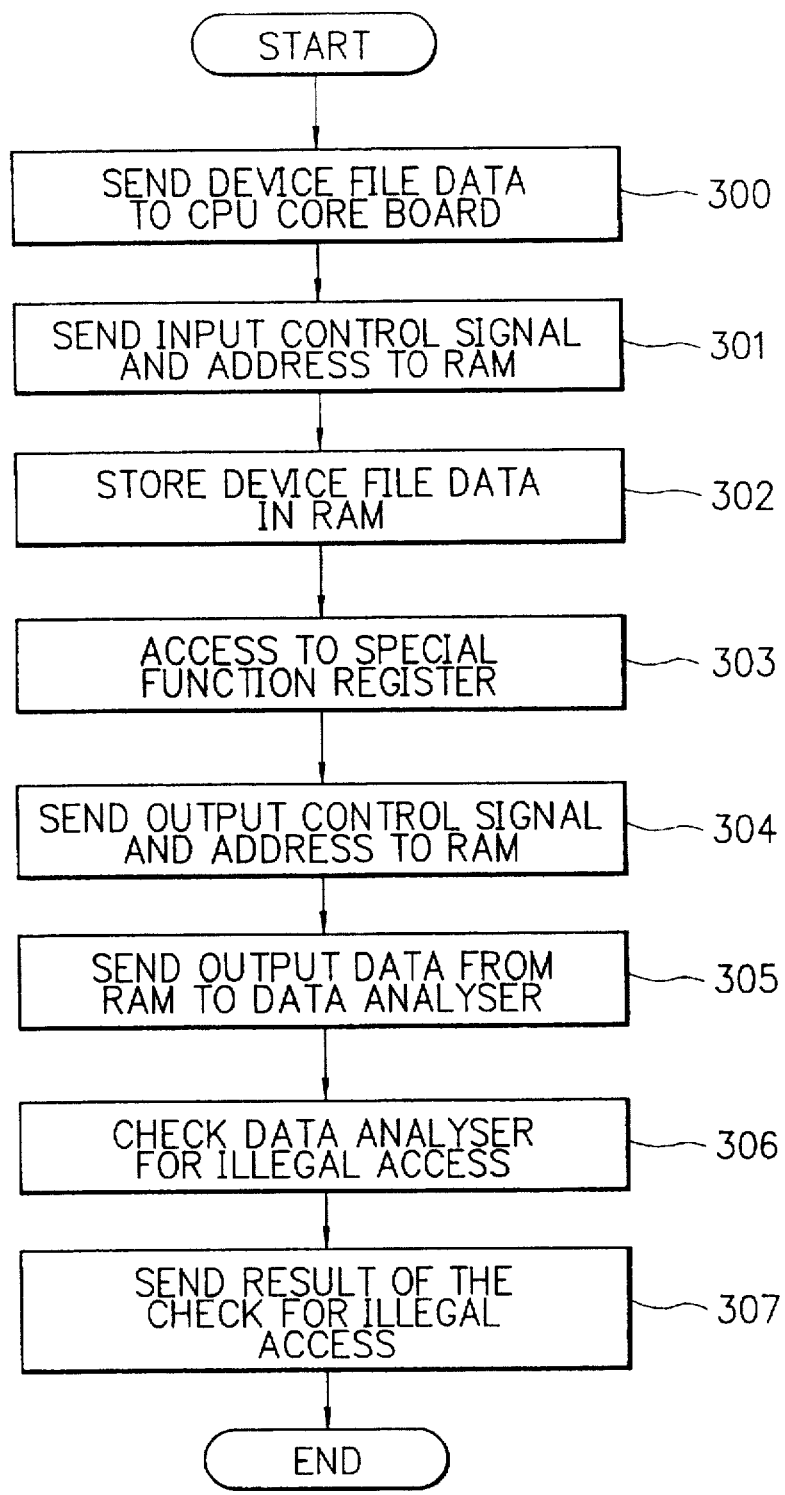
FIG. 6 is a flow chart of operational steps in the emulator of FIG. 4.

FIG. 6 is a flow chart of operational steps in the emulator 110.

First, the device file data 100 in data storage sections such as a memory and a hard disc of the host computer 101 are input via the cable 102 to the interface section 103 of the emulator 110, wherefrom they are sent via the system bus 104 to the CPU core board 120 (this step is designated at character 300).

In that state, the RAM I/O control 132 is supplied with the SVMOD signal which is "1" as the user's program is not under execution, so that the OR gate 213 outputs "1". Concurrently therewith, the A(9:0) signal is input to an address terminal A9-0 of the RAM 131, whereby the RAM 131 is driven into an input write state (Step 301).

Then, the RAM 131 put in the input write state stores therein the device file data 100 sent to the CPU core board 120 (Step 302).

The device file data 100 includes information on special function registers each represented by three bits of the D2, D1 and D0 signals, as illustrated in FIG. 7. Among the three bits, two bits (D2 and D1 signals) represent whether or not the special function register is accessible for read/write. They are logically valued "01" if an enabled access is for read only, "10" for write only, and "11" for both read and write. The remaining one bit (D0 signal) represents a datalength to be treated, and stands "1" for a datalength of 16 bits or "0" for a datalength of 8 bits. No assignment is represented by "000".

It is now supposed that an 8-bit read access is made to a special function register accessible for 8-bit read that is represented by parameters in an uppermost row of a map of FIG. 7.

Referring still to FIG. 6, there occurs the 8-bit read access to the special function register in the user's program of which the emulator 110 makes an emulation (Step 303).

As the SVMOD signal and the STAD signal then both turn "0", the NOT gate 211 outputs "1" and the OR gate 213 outputs "0". Thus, the RAM 131 inputs "1" at the read/write control terminal 131a and "0" at the output enable terminal 131b (Step 304). At that time, the SA(9:0) signal is input to the address terminal A9-0 of the RAM 131 (Step 304).

The RAM 131 is thereby driven into a read state, in which the device file data 100 as the signals D2, D1 and D0 stored at an address designated by the SA(9:0) signal are read as the output data "a" to be input to the data analyzer 133 (Step 305).

In the input signals to the data analyzer 132, D2 is "0", D1 is "1" and D0 is "0" in this case. Accordingly, the OR gate 215 outputs "1". As the read access is executed, the EXURWB signal is "1", so that the AND gate 217 outputs "0" and the AND gate 218 outputs "1". Therefore, the OR gate 219 outputs "1" and hence the AND gate 225 outputs "1".

As the access is for 8 bits, the ESTBL signal is "1" and the ESTBH signal is "0". The AND gates 220 and 221 as well as the OR gate 222 output "0" and the NOT gate 223 outputs "1", and hence the OR gate 224 outputs "1". The outputs of the AND gate 225 and the OR gate 224 are input to the AND gate 226, which thus outputs "1" as the output signal "c" of the data analyzer 133 that represents a result of decision as to whether or not the access is illegal (Step 306).

The output signal "c" from the data analyzer 133 is supplied via the system bus 104, the interface section 103 and the cable 102 to the host computer 101 (Step 307). In this case, the signal "c" is "1" which means the access is judged to be correct.

According to the embodiment above, the special function register illegal access detector 130 to be common to a computer series is not placed on the device dependent board 125 which is thus permitted to have a design and estimation process to be remarkably contracted. Moreover, the device file data 100 are stored in the RAM 131, to be read therefrom for use, thus permitting a facilitated, flexible and immediate coping with a remodelling of a special function register.

Further, the device file data 100 is limited to parameters on a special function register, permitting an increased processing speed.

Furthermore, no need of outputting an interface signal to the device dependent board 125 effectively reduces a total signal line length, permitting an improved noise margin.

Figure 8:
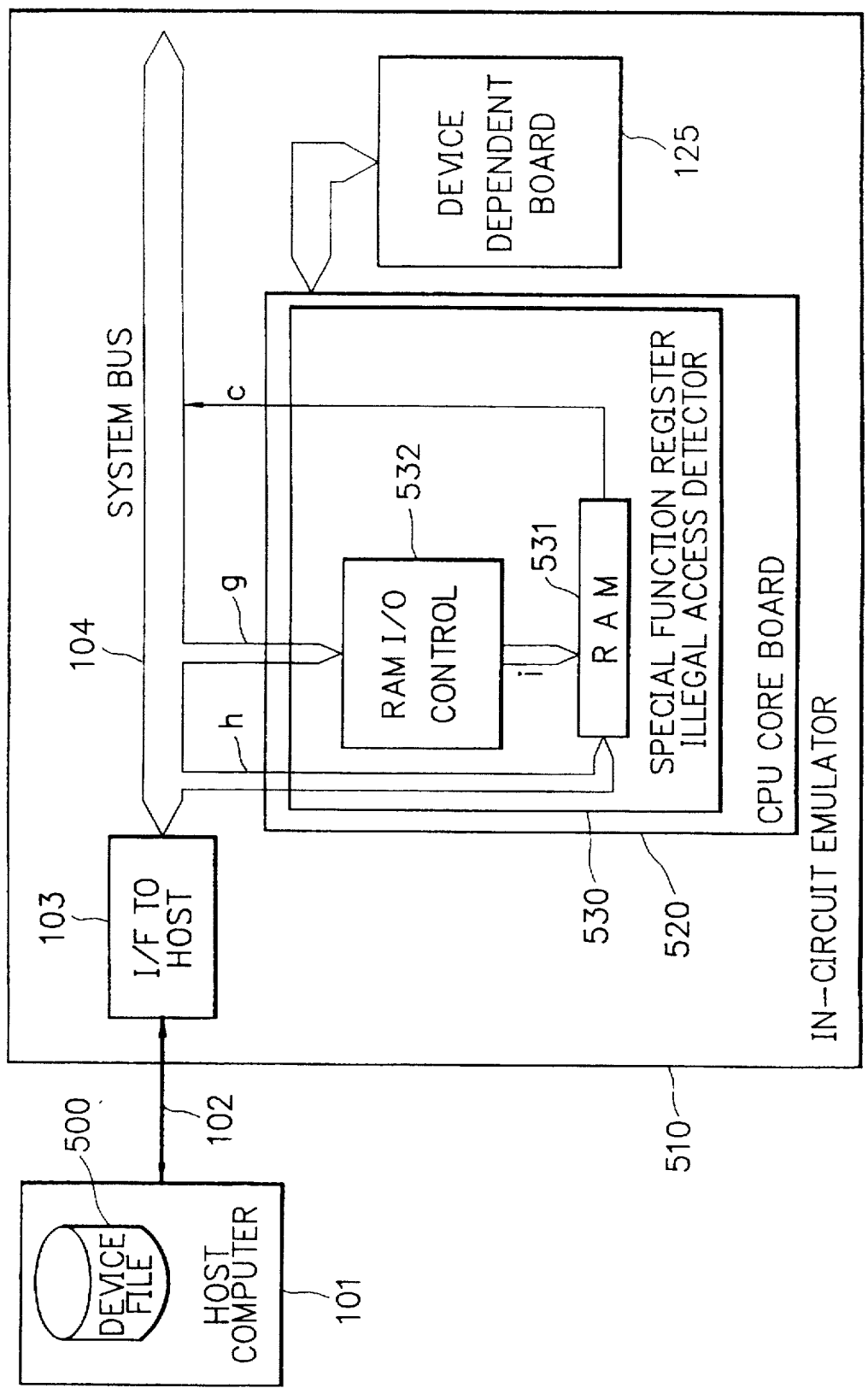
FIG. 8 is block diagram of an emulator according to another embodiment of the invention.

FIG. 8 shows an arrangement of an in-circuit emulator according to a second embodiment of the invention. Like members to FIG. 1 are designated with like characters.

In FIG. 8, designated at character 510 is the in-circuit emulator, which comprises an interface section 103 for interface to host computer, a system bus 104, a CPU core board 520 and a device dependent board 125. The CPU core board 520 has a special function register illegal access detector 530, which comprises a RAM 531 and a RAM I/O control 532.

In other words, the emulator 510 of FIG. 8 is different from the emulator 110 of FIG. 4 in that the data analyzer 133 is eliminated. In the first embodiment (FIG. 4), a process for generating control signals of the RAM 131 is separated from a process for analyzing output data from the RAM 131. In the second embodiment (FIG. 8), such processes are combined to be concurrently executed to thereby permit further improved high-speed processing.

The RAM I/O control 532 makes decisions based on a status signal as to a special function register accessed, as well as parameter thereof on read/write and datalength, to generate an address of the RAM 531. In the first embodiment, an address corresponding to a special function register accessed is employed to store therein parameters of the special function register. In the second embodiment, an address is generated not for each special function register accessed, but on a judgment as to which special function register is accessed in what manner, and further is employed as a location for storing a data representative of whether the access is illegal or not.

Figure 9:
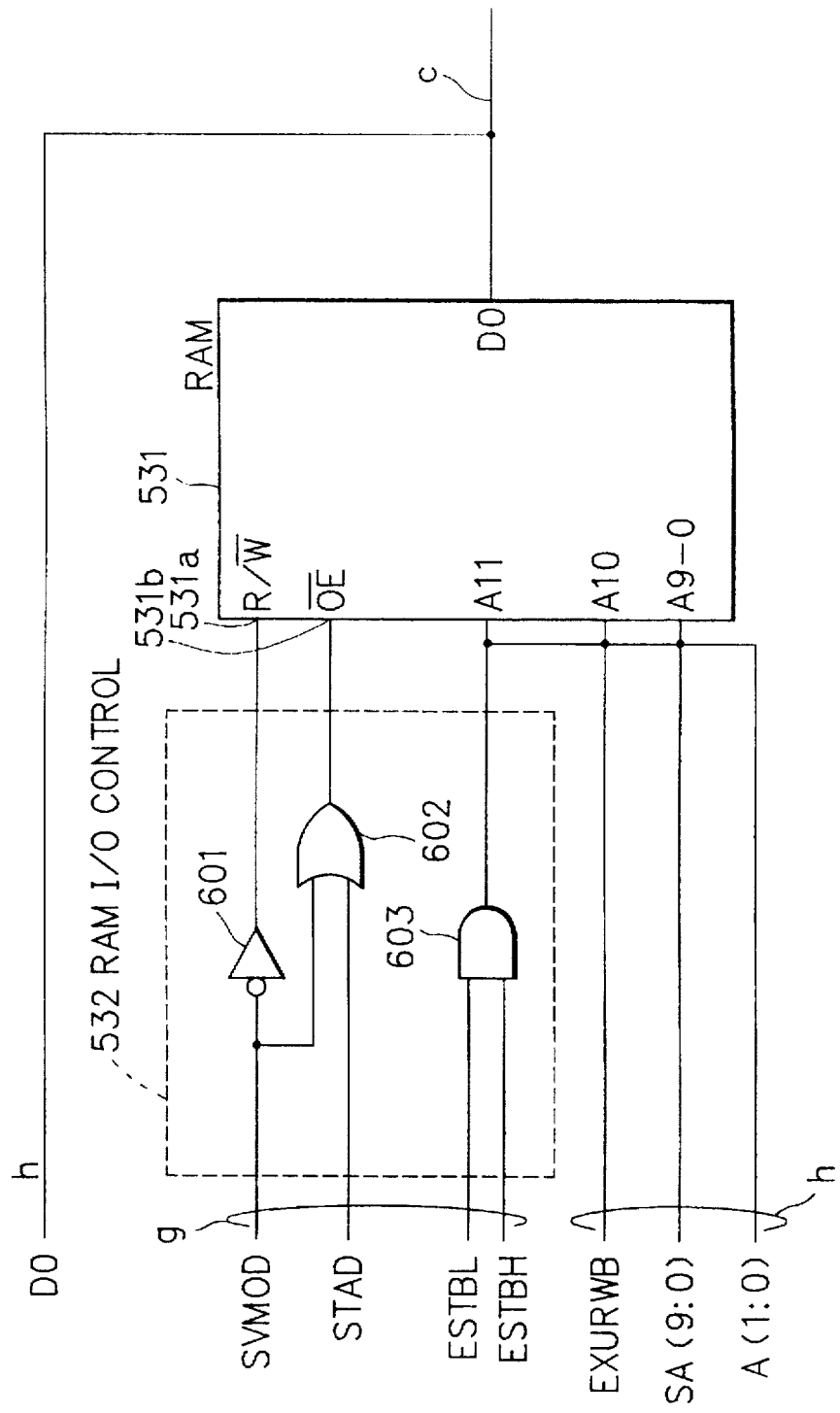
FIG. 9 is a circuit diagram of a special function register illegal access detector of the emulator of FIG. 8.

FIG. 9 is a circuit diagram of the special function register illegal access detector 530. Like members to FIG. 5 are designated with like characters.

The RAM I/O control 532 comprises a NOT gate 601, an OR gate 602 and an AND gate 603. The RAM 531 has a read/write control terminal 531a for inputting an output from the NOT gate 601, and an output enable terminal 531b for inputting an output from the OR gate 602. An output signal of the AND gate 603 is input to three address terminals A9-0, A10 and A11 of the RAM 531.

The RAM I/O control 532 is supplied with a signal "g" from the system bus 104, which signal "g" comprises a combination of four signals, i.e., an SVMOD signal, an STAD signal, an ESTBL signal and an ESTBH signal.

The RAM 531 is supplied with a signal "h" from the system bus 104, which signal "h" comprises a combination of four signals, i.e., a D0 signal, an EXURWB signal, an SA(9:0) signal and an A(11:0) signal. The A(11:0) signal is an address signal for storing device file data 500 in the RAM 531.

FIG. 10 is a flow chart of operational steps in the emulator 510. Like steps to FIG. 6 are designated with like characters.

In a step 300, the device file data 500 are input to the CPU core board 520.

In that state, the SVMOD signal is "1" and hence the NOT gate 601 outputs "0", and the OR gate 602 outputs "1", whereby the RAM 531 is driven into an write enable state (Step 701). Concurrently therewith, the signal A(11:0) is input to the address terminals of the RAM 531 (Step 701).

Then, the RAM 531 put in the write enable state stores therein the device file data 500 (Step 702).

The stored device file data 500 have "0" output for an illegal access and "1" output for a correct access, as shown in FIG. 11.

In FIG. 11, each value in " " is a data to be output. A block 800 is a block for storing data for 8-bit write accesses. For example, an 8-bit write access to a special function register 2 corresponds to a second row of the block 800, and is correct. Likewise, a block 801 is for an 8-bit read access, a block 802 is for a 16-bit write access, and a block 803 is for a 16-bit read access.

In FIG. 10, at a step 303, there occurs an access to a special function register like FIG. 6. Then, a RAM output control signal and an address are sent to the RAM 531 (Step 704). As the SVMOD signal and the STAD signal are both "0" in this case, the NOT gate 601 outputs "1" and the OR gate 602 outputs "0", rendering the RAM 531 readable. In that state, the ESTBL signal is "1" and the ESTBH signal is "0", causing the AND gate 603 to output "0". The EXURWB signal is "1", which is input together with the SA(9:0) signal to the address terminals of the RAM 531.

The RAM 531 is thus put in a read-out state, where a stored device file data 500 is read to be output as the signal "c" representative of a result of decision as to whether or not an access is illegal, via the system 104, the interface section 103 and the cable 102 to the host computer 101 (Step 705).

Therefore, like effects to the first embodiment are achieved in the second embodiment as well. In addition thereto, as no data analyzer is present in the special function register illegal access detector 503, the second embodiment has a simplified circuit arrangement relative to the first embodiment, permitting an improved high-speed processing.

As will be understood from the foregoing description, according to the present invention, necessary data for detecting an illegal access of an object device of emulation to a special function register are input from a host computer via an interface section to a CPU core board, thereby eliminating a conventional special function register illegal access detector from a device dependent board subjected to design and estimation processes for each developed model of a device, thus permitting an effective reduction in number of required man-hours for such processes.

Moreover, according to the present invention, necessary data for detecting an illegal access of an object device of emulation to a special function register are read from a host computer via an interface section, to be stored in a special function register illegal access detector, permitting a facilitated and flexible adjustment to a change in a special function register which typically tends to have a limitation to a length of data to be processed, thus permitting a remarkable effect to be achieved along with such a change as well as in detection of an illegal access.

Further, an arrangement with a readable and writable memory in a special function register illegal access detector allows an increased processing speed, in addition to that data to be stored in the memory are limited to those necessary for detecting an illegal access of an object device of emulation to a special function register, permitting the more improved high-speed processing.

Furthermore, a special function register illegal access detector provided in a CPU core board effectively eliminates the need of an interface signal to be output to a device dependent board, thus permitting a total signal line length to be reduced, resulting in an improved noise margin.

Still more, a special function register illegal access detector is composed of a memory and an input/output control that generates an address in accordance with a decision as to which special function register is accessed in what manner, without the need of a data analyzer, permitting a simplified circuit arrangement.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An emulator comprising:
   a CPU core board means for emulating a core section of a central processing unit of a microcomputer;

a device dependent board means for emulating a peripheral device of the central processing unit; and an interface means for interfacing the CPU core board means and the device dependent board means with the microcomputer;

wherein the interface means transfers necessary data including address information and comparison information, for detecting an illegal access to a special function register by an object device which is subject to emulation by at least one of said CPU board means and said device dependent board means, said interface means transferring the necessary data from the microcomputer to the CPU core board means; and wherein the CPU core board means comprises a special function register illegal access detector means for storing therein the address information of the necessary data transferred from the microcomputer, for processing the address information and comparison information to determine whether access by the object device is legal or not, and for outputting a signal indicative of the legality of the access of the object device via the interface means to the microcomputer, wherein the special function register illegal access detector means comprises:

a readable and writable memory means for storing therein the address information input from the microcomputer;

an input-output control means for controlling the memory means in accordance with a first and second mode signal received from the microcomputer; and a data analyzer means for responding to the address information read from the memory means to make a decision on the legality of the access by the object device to the special function register said decision being based on whether the special function register is to be readable, whether or not the special function register is to be writable, and whether the necessary data sent by the microcomputer includes a correct length of data corresponding to the special function register, and to output the decision.

2. An emulator comprising:

a CPU core board means for emulating a core section of a central processing unit of a microcomputer;

a device dependent board means for emulating a peripheral device of the central processing unit; and an interface means for interfacing the CPU core board means and the device dependent board means with the microcomputer;

wherein the interface means transfers necessary data including address information and comparison information, for detecting an illegal access to a special function register by an object device which is subject to emulation by at least one of said CPU board means and said device dependent board means, said interface means transferring the necessary data from the microcomputer to the CPU core board means; and wherein the CPU core board means comprises a special function register illegal access detector means for storing therein the address information of the necessary data transferred from the microcomputer, for processing the address information and comparison information to determine whether access by the object device is legal or not, and for outputting a signal indicative of the legality of the access of the object device via the interface means to the microcomputer, wherein the special function register illegal access detector means comprises:

a readable and writable memory means for storing therein address information input from the microcomputer; and an input-output control means receiving a first and second mode signal for responding to the necessary data input from the microcomputer to make a decision on the legality of the access by the object device to the special function register, based on a first determination as to whether the special function register is to be readable or writeable, and a second determination as to whether the necessary data sent by the microcomputer includes a correct length of data corresponding to the special function register and for generating an output address based on said first and second determinations, and wherein the special function register illegal access detector means outputs the decision from the memory means based on the output address.

3. An emulator according to claim 1, wherein said input-output control means includes:

an inverter receiving said first mode signal and outputting a result to a read/write control terminal of said memory means; and an OR gate receiving an inverted first mode signal from said inverter and said second mode signal and outputting a logical sum of said OR gate to an output enable terminal of said memory means.

4. An emulator according to claim 3, wherein said address information input from the microcomputer includes, for each special function register, information indicating whether an address is read only, read write, write only and a bit length corresponding to the address.

5. An emulator according to claim 2, wherein the input output control means includes:

an inverter receiving said first mode signal and outputting a result to a read/write control terminal of said memory means;

an OR gate receiving an inverted first mode signal from said inverter and said second mode signal and outputting a logical sum of said OR gate to an output enable terminal of said memory means; and an AND gate receiving a first and second comparison information from said microcomputer to make the first determination as to whether the special function register is to be readable or writable and outputting a logical product of said AND gate to address control terminals of said memory means.

6. An emulator according to claim 5, wherein said address information input from the microcomputer includes a first block of addresses indicating which of said special function registers permits an 8-bit write operation; a second block of addresses indicating which is said special function registers permits an 8-bit read operation; a third block of addresses indicating which of said special function registers permits a 16-bit write operation; and a fourth block of addresses indicating which of said function registers permits a 16-bit read operation.

* * * * *